(12) United States Patent
Zhang et al.

(10) Patent No.: US 12,093,419 B2
(45) Date of Patent: Sep. 17, 2024

(54) METHODS AND DEVICES FOR MANAGING USER IDENTITY AUTHENTICATION DATA

(71) Applicant: VeChain Global Technology, S.AR.L, Luxembourg (LU)

(72) Inventors: Yang Zhang, Shanghai (CN); Jianliang Gu, Shanghai (CN)

(73) Assignee: VeChain Global Technology, S.AR.L, Luxembourg (LU)

( * ) Notice: Subject to any disclaimer, the term of this patent is extended or adjusted under 35 U.S.C. 154(b) by 744 days.

(21) Appl. No.: 17/250,755

(22) PCT Filed: Sep. 3, 2019

(86) PCT No.: PCT/IB2019/057406
§ 371 (c)(1),
(2) Date: Mar. 1, 2021

(87) PCT Pub. No.: WO2020/049452
PCT Pub. Date: Mar. 12, 2020

(65) Prior Publication Data
US 2021/0319132 A1    Oct. 14, 2021

(30) Foreign Application Priority Data

Sep. 3, 2018  (CN) .......................... 201811021607.2

(51) Int. Cl.
G06F 21/00  (2013.01)
G06F 16/245  (2019.01)
(Continued)

(52) U.S. Cl.
CPC ........ *G06F 21/6227* (2013.01); *G06F 16/245* (2019.01); *G06F 21/602* (2013.01);
(Continued)

(58) Field of Classification Search
CPC .. G06F 21/6227; G06F 16/245; G06F 21/602; H04L 9/3239; H04L 9/3247;
(Continued)

(56) References Cited

U.S. PATENT DOCUMENTS 8,914,898 B2   12/2014  Tharakan
9,876,646 B2   1/2018   Ebrahimi et al.
(Continued)

FOREIGN PATENT DOCUMENTS

CN    102638473 B    12/2014
CN    105991650 A    10/2016
(Continued)

*Primary Examiner* — Josnel Jeudy
(74) *Attorney, Agent, or Firm* — Downs Rachlin Martin PLLC

(57) ABSTRACT

Implementations of the subject matter described herein provide a method of managing user identity authentication data, a method of authorizing a query, a management device, an authentication device, a terminal, a non-transitory computer readable storage medium and a computer program product. At the management device, a query request from a query requester for original identity data of a user to be queried is authenticated, the query request including at least a key for encrypting the original identity data to be queried; in response to the query request being successfully authenticated, authorization information for the query request is sent to the query requester; at least one authentication device from a plurality of authentication devices for storing the original identity data to be queried is determined based on mapping information associated with the original identity data stored by a plurality of authentication devices; and in response to receiving signature information about the original identity data to be queried from the user to be queried, signature information and a key is transmitted to the at least one authentication device, wherein the signature information (Continued)

is generated by a terminal device of the user to be queried based on authorization information received from the query requester.

24 Claims, 6 Drawing Sheets

(51) Int. Cl.
*G06F 21/60* (2013.01)
*G06F 21/62* (2013.01)
*H04L 9/32* (2006.01)
*H04L 9/00* (2022.01)

(52) U.S. Cl.
CPC .......... *H04L 9/3239* (2013.01); *H04L 9/3247* (2013.01); *H04L 9/50* (2022.05)

(58) Field of Classification Search
CPC . H04L 9/50; H04L 9/32; H04L 63/00; H04W 12/00; H04W 12/001; H04W 12/06
USPC ........................................................ 713/176
See application file for complete search history.

(56) References Cited

U.S. PATENT DOCUMENTS

| | | | |
|---|---|---|---|
| 9,882,892 B1 | 1/2018 | Vogel et al. | |
| 9,979,725 B1 | 5/2018 | Liu et al. | |
| 10,121,143 B1 | 11/2018 | Madisetti et al. | |
| 10,298,571 B2 | 5/2019 | Andrade | |
| 2007/0143860 A1* | 6/2007 | Hardt | H04L 63/0421 |
| | | | 726/28 |
| 2008/0086767 A1 | 4/2008 | Kulkarni et al. | |
| 2014/0223578 A1* | 8/2014 | Ross | G06F 21/41 |
| | | | 726/28 |
| 2016/0134617 A1 | 5/2016 | Mani et al. | |
| 2017/0006010 A1* | 1/2017 | Miu | G06Q 20/4016 |
| 2017/0140174 A1 | 5/2017 | Lacey et al. | |
| 2018/0204213 A1 | 7/2018 | Zappier et al. | |
| 2018/0343120 A1 | 11/2018 | Andrade | |
| 2019/0044917 A1 | 2/2019 | Mork et al. | |
| 2019/0173873 A1 | 6/2019 | Brown et al. | |
| 2019/0199535 A1 | 6/2019 | Falk | |

FOREIGN PATENT DOCUMENTS

| | | |
|---|---|---|
| CN | 106533696 A | 3/2017 |
| CN | 109040139 A | 12/2018 |
| EP | 3477891 A1 | 5/2019 |
| JP | 2011130420 A | 6/2011 |
| WO | 2015135331 A1 | 9/2015 |
| WO | 2017020452 A1 | 2/2017 |
| WO | 2018233536 A1 | 12/2018 |

* cited by examiner

METHODS AND DEVICES FOR MANAGING USER IDENTITY AUTHENTICATION DATA

FIELD

The present disclosure relates to methods and devices for managing user identity authentication data, and more specifically to methods for managing user identity authentication data with systems that include a blockchain platform, a method for authorizing a query, a management device, an authentication device, a user terminal device, a non-transitory computer readable storage medium and a computer program product.

BACKGROUND

Individuals or companies need to be authenticated in many scenarios. In traditional user identity data authentication and management schemes, individuals or companies need to submit original identity data (such as scanned copies of an individual's ID card, scanned copies of the company's business license, etc.) to different authentication authorities for identity authentication. For example, when a company applies to become a seller of an Internet Platform A, it is necessary that a designated KYC (Know Your Customer) certification authority performs verification and authentication on the original identity material or data (such as scanned copies of the company's business license, primary contact and the beneficiary owner's identity card, account opening license or public bank statement, etc.) submitted by the company, and duration of the verification and authentication may be a few days or longer. When the company applies to become a seller of an Internet Platform B or applies for other qualifications, it is also required that other KYC certification authorities to perform other verification and authentication on the original identity data submitted by the company.

In the traditional user identity data authentication and management schemes, since the original identity authentication data, the authentication processes and the authentication results of different certification authorities are relatively independent, there is no effective, credible and authorized data interaction solutions, which causes different certification authorities to repeatedly verify and authenticate the same original identity data of the same user, resulting in a waste of a large amount of social resources. Itis not conducive to improve the efficiency of identity authentication, as well as efficient management and trusted sharing of the identity authentication data.

SUMMARY

The present disclosure provides a method and device for managing user identity authentication data, which can effectively implement trusted sharing of user identity authentication data authenticated by the certification authority.

According to a first aspect of the present disclosure, there is provided a method for managing user identity authentication data. The method includes: authenticating, at a management device, a query request from a query requester for original identity data of a user to be queried, the query request including at least a key for encrypting the original identity data to be queried; in response to the query request being successfully authenticated, sending authorization information for the query request to the query requester; determining, based on mapping information associated with the original identity data stored by a plurality of authentication devices, at least one authentication device from the plurality of authentication devices for storing the original identity data to be queried; and in response to receiving signature information about the original identity data to be queried from the user to be queried, transmitting signature information and a key to the at least one authentication device, the signature information being generated by a terminal device of the user to be queried based on authorization information received from the query requester.

According to a second aspect of the present disclosure, there is provided a method for managing user identity authentication data. The method includes: at an authentication device, transmitting mapping information to a user identity authentication data management device, the mapping information being associated with original identity data stored by the authentication device; obtaining, from the management device, signature information and a key related to authorization of the original identity data to be queried of a user to be queried; in response to confirming that the signature information is successfully authenticated, encrypting, based on a key, the original identity data to be queried and a hash value of the original identity data to be queried, the hash value of the original identity data to be queried being obtained from a blockchain platform; and sending the encrypted original identity data to be queried and the encrypted hash value of the original identity data to be queried to the management device or the query requester, the hash value of the original identity data to be queried being used to authenticate the original identity data to be queried.

According to a third aspect of the present disclosure, there is provided a method for authorizing a query of user identity authentication data. The method includes: at a terminal device of a user to be queried, obtaining authorization information from the query requester, the authorization information being related to original identity data to be queried; sending feedback data to a management device, the feedback data being generated based on the authorization information; obtaining an authorization confirmation request from the management device, the authorization confirmation request being generated by the management device in response to confirming that the feedback data matches the authorization information; in response to confirming authorization for the authorization confirmation request, sending signature information regarding the original identity data to be queried to the management device.

According to a fourth aspect of the present disclosure, there is provided a management device for user identity authentication data. The device includes: a memory configured to store one or more programs; and a processing unit coupled to the memory and configured to execute said one or more programs to cause the management device to perform the method in the first aspect of the present disclosure.

According to a fifth aspect of the present disclosure, there is provided an authentication device for user identity authentication data. The device includes: a memory configured to store one or more programs; and a processing unit coupled to the memory and configured to execute said one or more programs to cause the authentication device to perform the method in the second aspect of the present disclosure.

According to a sixth aspect of the present disclosure, there is provided a user terminal device. The device includes: a memory configured to store one or more programs, a processing unit coupled to the memory and configured to execute said one or more programs to cause the user terminal device to perform the method in the third aspect of the present disclosure.

According to a seventh aspect of the present disclosure, there is provided a non-transitory computer readable storage medium having machine executable instructions stored thereon, the machine executable instructions, when executed, causing a machine to perform the method of any of the first, second and third aspects of the present disclosure.

According to an eighth aspect of the present disclosure, there is provided a computer program product. The computer program product being tangibly stored on a non-transient computer readable medium and comprising machine executable instructions, the machine executable instructions, when being executed, causing a machine to perform of any of the first, second and third aspects of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objects, features and advantages of the present disclosure will be made more apparent by describing exemplary embodiments of the present disclosure in more detail with reference to figures, wherein identical reference signs represent identical parts in the exemplary embodiments of the present disclosure.

Figure 1:
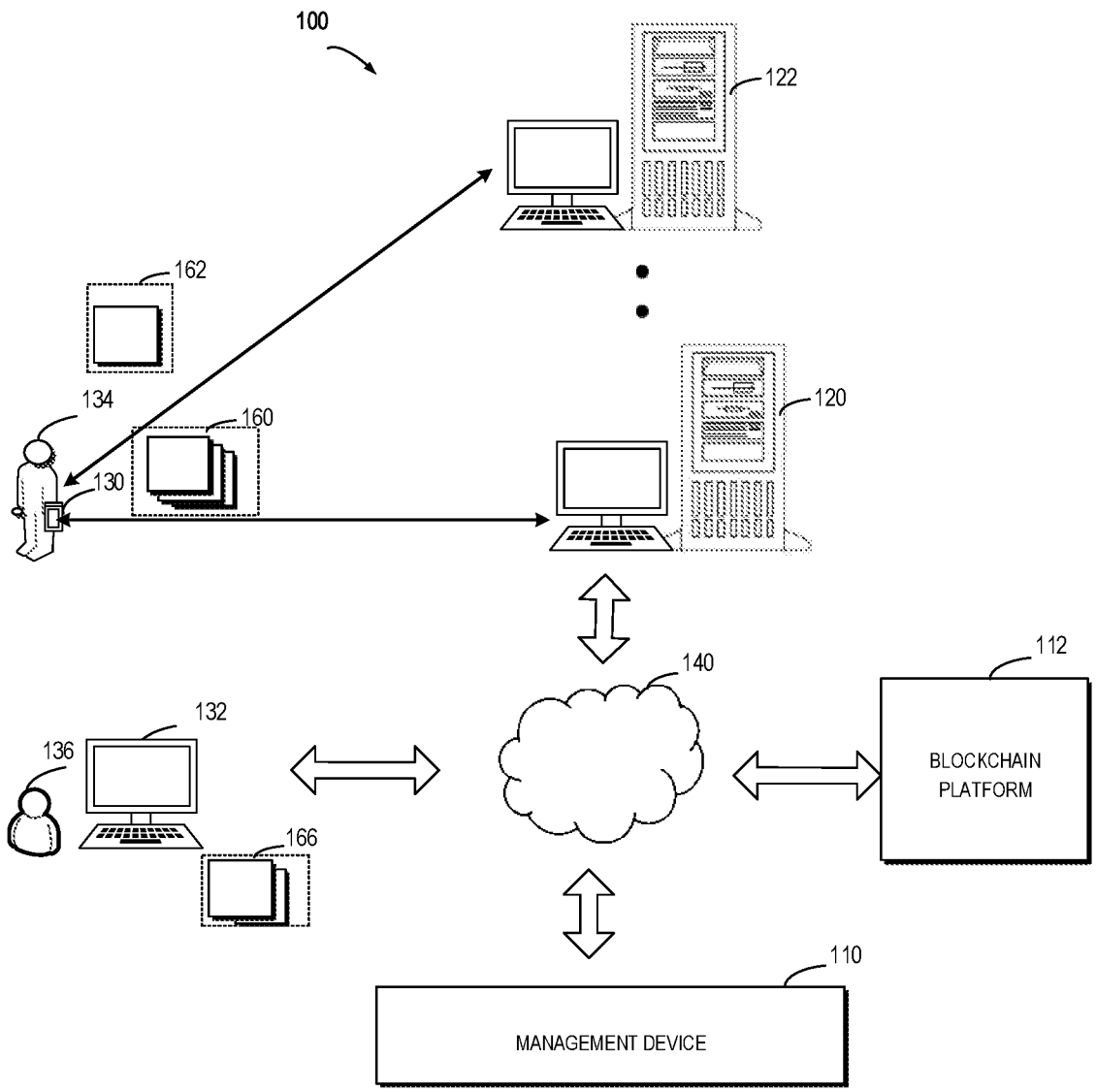
FIG. 1 illustrates an architecture diagram of a management system 100 for user identity authentication data according to embodiments of the present disclosure.

Throughout the drawings, identical or similar signs are used to indicate same or corresponding element.

DETAILED DESCRIPTION

Example embodiments of the present disclosure will be described in more detail with reference to the accompanying figures. Although the figures show example embodiments of the present disclosure, it should be appreciated that the present disclosure may be implemented in various forms and should not be limited by embodiments described here. On the contrary, these embodiments are provided to make the present disclosure more transparent and complete and convey the scope of the present disclosure completely to those skilled in the art.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

As stated above, in traditional user identity authentication and data management schemes, original identity authentication data, authentication processes and authentication results of different certification authorities are relatively independent due to, for example, lack of security measures for data interaction and lack of user credit information for querying original identity data. The credible data interaction cannot be realized, so that the same original identity data of the same user is repeatedly authenticated by different certification authorities, and the credible authentication results certified by the certification authorities cannot be effectively utilized, thereby causing a waste of a large amount of social resources, which is not conducive to improve the efficiency of identity authentication and achieve efficient management and trusted sharing of identity authentication data.

In order to at least partially address one or more of the above problems, as well as or alternatively other potential problems, an example embodiment of the present disclosure proposes a management scheme for user identity authentication data. In a solution, a management device authenticates a query request from a query requester for original identity data of a user to be queried, the query request including at least a key for encrypting the original identity data to be queried; in response to the query request being successfully authenticated, the management device sends authorization information for the query request to the query requester; the management device determines, based on mapping information associated with the original identity data stored by a plurality of authentication devices, at least one authentication device from the plurality of authentication devices for storing the original identity data to be queried; and in response to receiving signature information about the original identity data to be queried from the user to be queried, the management device transmits the signature information and the query request key to the at least one authentication device, the signature information being generated by a terminal device of the user to be queried based on the authorization information received from the query requester at the terminal device of the user to be queried.

In the above solution, by authenticating the query request and sending the authorization information for the query request to the query requester in response to the query request being successfully authenticated, it is possible to effectively ensure that the data query content involved by the query request is confirmed or supervised by the management device, and the interface about the authorization information between the query requester and the user to be queried is also confirmed and supervised by the management device. By determining at least one authentication device by using mapping information associated with original identity data stored by the plurality of authentication devices and transmitting signature information and a key thereto, it is possible to effectively query for original identity data stored by the plurality of authentication devices. By transmitting the signature information and the key (for example, the public key from the query requester) to the at least one authentication device in response to receiving the signature information about the original identity data from the user to be queried, it is possible to effectively ensure, in case of having obtained the authorization of the user to be queried, encrypting the authenticated original identity data so as to open the authenticated original identity data only for a particular query requester that has obtained the authentication information. Therefore, the management scheme of user identity authentication data proposed by the exemplary embodiments of the present disclosure may effectively implement trusted sharing of authenticated user identity authentication data.

FIG. 1 illustrates an architecture diagram of a management system 100 for user identity authentication data according to embodiments of the present disclosure. As shown in FIG. 1, the system 100 comprises a management device 110, a blockchain platform 112, a plurality of authentication devices 120, 122, and a plurality of user terminals (e.g., a mobile phone 130, a computer 132, among others). The management device 110, the blockchain platform 112, the authentication devices 120 and 122, and the user terminals 130 and 132 perform data interaction via the network 140.

The user may send original identity data and an authentication request to the authentication device 120 and/or 122 via the user terminal. When the user is the query requester, the user terminal may be used to transmit a query request to the management device 110 for the original identity data of the user to be queried, or when the user is a user to be queried, the user terminal may be used to transmit signature information for the original identity data to be queried to the management device 110. As shown in FIG. 1, through the user terminal 130, the user 134 may submit one or more original identity data for authentication and storage. For example, user 134 may transmit first original identity data 160 and a first authentication request to the authentication device 120 for identity data authentication and storage; and in some examples, may also transmit second original identity data 162 and a second authentication request to the authentication device 122 for identity data authentication and storage, and so on. In one example, the authentication device 120 for identity data authentication may belong to a bank certification authority, for example, and the first original identity data 160 may be an image and/or a document of a company business license scan, for example. The authentication device 122 may be a completely separate, unrelated, and different type of authority than authentication device 120. For example, authentication device 122 for identity data authentication may be a certification authority of the Internet operating platform, for example, and the second original identity data 162 may be an image and/or a document of a scanned copy of the ID card, a diploma, a company's business license, and the like, for example.

In some embodiments, a wallet application may be run on the user terminal 130. The user 134 may register with the authentication device 120 and/or 122 through the wallet application to obtain an associated account identifier that may uniquely identify the user at the corresponding authentication device, and the associated account identifier may be, for example but not limited to, a combination of the user's identification (such as a mailbox or mobile phone number) and the associated account identification of the authentication device that stores the user's original identity data connected by a connector (e.g., ".", "-", etc.). For example, assuming that the user 134 registers with the authentication device 120 with its mobile phone number 18912345678, and the associated account identifier of the authentication device 120 is IDA, the associated account identifier obtained by the user 134 on the authentication device 120 through the wallet application may be represented as "IDA.18912345678". It can be seen that the associated account identifier of the user not only indicates the user identifier, but also indicates the associated account identifier of the authentication device 120 associated with the user, i.e., the associated account identifier of the authentication device 120.

User 136 may be a business that wants to verify the identity of user 134 before, e.g., providing a service to the user 134 offered by the business. Thus, in one example, user 134 may request a service from user 136 but user 134 does not need to re-submit original identity data, such as first original identity data 160, to user 136. Instead, user 136 may submit a request to management device 110 to request authenticated original identity data. For example, a query request from user 136 may include the public address of user 134 and identify the businesses (authentication devices 120, 122) that may have authenticated original identity data for user 134. Management device 110 can use the mapping information to determine if the authentication device(s) of the specified business(es) have authenticated any identity data for the specified user.

As described more below, in some embodiments, the management device 110 may authenticate a query request from query requestor 136 after obtaining the query request submitted by the query requester via the computer 132, and send authorization information including a temporary session token to the query requester in response to confirming that the query request has been successfully authenticated. The authorization information may then be sent from the query requestor 136 to the user terminal 130, the user terminal receiving the authorization information via, e.g., the wallet application. The authorization information may be configured in a two-dimensional code format, for example which may be decoded by the user terminal 130 in order to obtain the temporary session token included in the authorization information.

In some embodiments, the user terminal 130 may also use a key, e.g., of the user 134, to generate the signature information by signing the authorization information with the key. The signature information can then be transferred from the user 134 to the management device 110, indicating the user authorizes the query requestor's receipt of the user's identity information from the authentication devices 120, 122. The signature information can be a signature grant for an authorization confirmation request (e.g., the temporary session token, an authorization code in the form of a random number) from the management device 110 via the wallet application. The management device can then transmit the signature information to the authentication devices 120, 122, authorizing the release of the user's authenticated identity information to the query requestor.

In some embodiments, when the user 136 is the query requester, at the terminal device 132, it may then obtain the to-be-queried original identity data encrypted by an encryption key (e.g., a public key for asymmetrical encryption) sent from the authentication device 120, 122, and a hash value of the to-be-queried original identity data, decrypt the obtained information by using a decryption key (e.g., a private key for asymmetrical encryption), generate a hash of the decrypted original identity data, and based on the obtained hash value of the original identity data to be queried, authenticate the authenticity of the acquired original identity data to be queried.

The authentication devices 120, 122 are used for authenticating, storing, and managing one or more original identity data (e.g., the first original identity data 160, the second original identity data 162) of users. The authentication device 120 or 122 may belong to one or more KYC enterprises, for example. The authentication devices 120, 122 may establish connection with the management device 110 by an initialization process to implement management of the user KYC information. For example, the authentication devices 120, 122 may apply to the management device 110 for an identifier (such as a username) and password for accessing the management device 110 and an associated account for identity data management at the management device 110. The authentication devices 120, 122 may also periodically synchronize at least one of mapping information, authentication device domain name and a query rule to the management device 110. Herein the mapping information may be a 256-bit data dictionary rule for describing the meaning of each flag of an authentication result of original identity data previously received at one of authentication device 120, 122 from user 134 and stored by the authentication devices 120, 122. For example, certain bits may correspond to different identity data types, such as sex (male/female), physical address, credit history, etc. A value of a flag for a given bit, e.g., 0 or 1 may indicate whether a particular authentication device has original identity data for that particular KYC data type. The query rule may be used to indicate a queryable range of the original identity data, for example a range or size of data used for authentication results by a particular authentication device. The domain name may be used to indicate a corresponding authentication device at the management device 110. The authentication devices 120, 122 may also generate identity authentication result data when the original identity data is successfully authenticated, and transmit the identity authentication result data to the blockchain platform 112 through a smart contract deployed via a private key of the authentication device. Thus, the authentication of original identity data can be performed only once, and the authentication result saved for future access as described more below, such that different certification authorities do not need to repeatedly verify and authenticate the same original identity data of the same user, thereby saving social resources.

The authentication devices 120, 122 may be further configured to, after acquiring the signature information signed by the private key of the user to be queried and in response to confirming that the signature information has been successfully authenticated, provide, via the management device 110, the query requester (e.g., user 136) with the to-be-queried original identity data (e.g., the first original identity data 160 or the second original identity data 162 as described above, or third original identity data different from the first original identity data 160 and the second original identity data 162) encrypted by the key (e.g., the query requestor's public key) and the hash value 166 of the to-be-queried original identity data stored by the blockchain platform 112. In some embodiments, the authentication devices 120, 122 may further include a module for managing the user associated account, an encryption module for the user to encrypt the original identity data, an encryption module for encrypting the original identity data to be queried and the hash value of the original identity data to be queried, and so on.

The management device 110 may be used for management of user identity authentication data. The management device 110 may be interconnected, via a network 140, with a plurality of distributed authentication devices 120, 122 to store mapping information, domain names, and query rules for each of the plurality of distributed authentication devices 120, 122. In some embodiments, the management device 110 may authenticate a query request after obtaining the query request submitted by the query requester (e.g., the user 136) via the computer 132, and send authorization information including a temporary session token to the query requester in response to confirming that the query request has been successfully authenticated. As noted above, the query requestor can then send the authorization information to the user 134 to be queried and the user to be queried can authorize the request by signing the authorization information, thereby generating the signature information, and transmit the signature information to the management device 110. In response to receiving the signature information about the original identity data from the user 134 to be queried, send the signature information and the key (e.g., the query requestor's public key) to the determined at least one authentication device 120 and/or 122 that stores the original identify data to be queried, so as to obtain and forward the to-be-queried user original data and a hash value 166 of the to-be-queried original identity data stored by the blockchain platform 112 to the query requester 136. In some embodiments, the to-be-queried user original data and the hash value 166 of the to-be-queried original identity data stored by the blockchain platform 112 may also be directly sent from the authentication devices 120, 122 to the query requester. In some embodiments, the management device 110 is a dedicated processing device, such as a centralized server, that is independent of the blockchain platform 112 and the authentication devices 120, 122. In some embodiments, the management device 110 may be integrated in the blockchain platform 112 or the authentication device 120 or 122 for user identity authentication.

The blockchain platform 112 may be used to deposit identity authentication result data. Architecturally, the blockchain platform 112 comprises, for example, a basic service layer, a smart contract layer and a blockchain bottom layer (not shown). The blockchain platform 112 performs data interaction with the management device 110 and the authentication devices 120, 122 via the network 140 and an application interface (not shown), for example. In some embodiments, the blockchain platform 112 can be based on a private chain, a public chain, or a federated chain. In some embodiments, the blockchain platform 112 is interconnected with a private key signing device (not shown) in the form of hardware, such as a USB key. The authentication devices 120, 122 may sign the identity authentication result data (when the original identity data was initially received by user 134 and successfully authenticated) by the private key signing device using the private key corresponding to the smart contract. The private key signature is then authenticated by the blockchain platform 112, and the authentication result data is stored on the blockchain platform 112 when the authentication is successful. In the above solution, since the writing and changing of the data on the blockchain platform 112 are signed by the private key of the private key signing device, it is possible to further ensure that the stored user identity authentication result data is secure and tamper-resistant.

Figure 2:
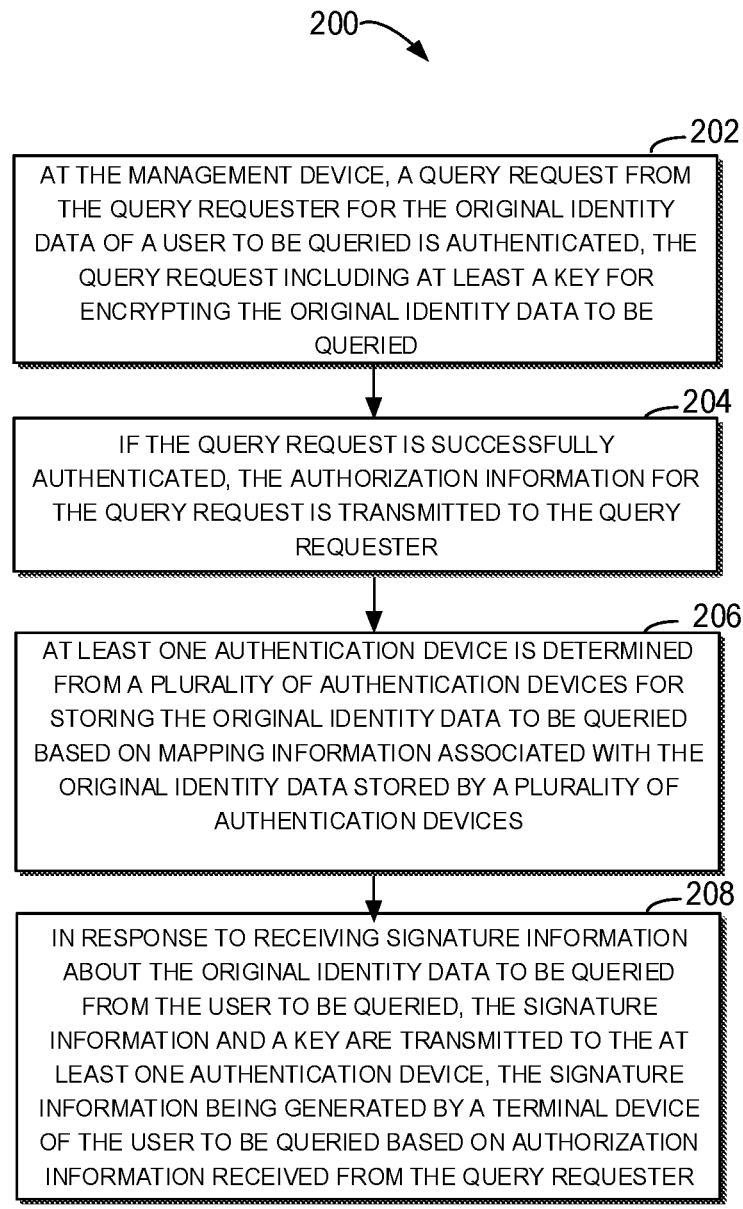
FIG. 2 illustrates a flow chart of a method 200 for managing user identity authentication data according to embodiments of the present disclosure.

FIG. 2 illustrates a flow diagram of a method 200 for managing user identity authentication data in accordance with embodiments of the present disclosure. In FIG. 2, various actions are performed by a processor of the management device 110 shown in FIG. 1, for example. The method 200 may also include additional actions not shown and/or may omit the actions shown, the scope of the disclosure being not limited in this respect.

At block 202, at the management device, a query request from the query requester for the original identity data of a user to be queried is authenticated, for example, by confirming whether the query requester is legitimate and whether one of the at least one authentication devices 120 or 122 contains the original identity data to be queried. The query request can include at least one query requestor key for encrypting the original identity data to be queried. For example, the query requester (e.g., the user 136) sends a query request to the management device 110, the query request, for example, indicating to query for the original identity data to be queried (e.g., a scanned copy of the ID card, an academic qualification scan) of the user (e.g., the user 134) to be queried. In some embodiments, the query request further indicates: the query requestor, the user to be queried and the original data to be queried. At this time, the query request indicates which original identity data of which user the query requester requests to query. In some embodiments, the query request may indicate the query requestor and the user to be queried, without specifying the original data to be queried. In this case, the query request indicates that the query requestor requests to query for all queryable original identity data of the user to be queried. In some embodiments, the query requestor encryption key mentioned above is, for example, a secret key in case of symmetric encryption or a public key in case of asymmetric encryption, and the original identity data comprises, for example, at least one of image data and text data.

At block 204, if the query request is successfully authenticated, authorization information for the query request is transmitted to the query requester. In some embodiments, transmitting the authorization information comprises: determining whether the query request is successfully authenticated based on confirming whether the query requester is legitimate and whether one of the at least one authentication devices 120 or 122 contains the original identity data to be queried; and if the query request is successfully authenticated, sending the authorization information to the query requester, the authorization information comprising a temporary session token. In some embodiments, confirming whether the query requester is legitimate for example comprises: confirming whether the query requester and the user to be queried have been registered with the management device 110 and confirming whether the identity of the original identity data to be queried belongs to a predetermined set. The predetermined set is, for example, a set predefined based on a query rule of the authentication devices 120, 122 and used to indicate which of the original identity data is available for query. In the foregoing solution, by authenticating the query request and sending the authorization information for the query request to the query requester if the query request is successfully authenticated, it is possible to effectively ensure that the data query content involved by the query request is confirmed or supervised via a management device or authority.

At block 206, at least one authentication device is determined from a plurality of authentication devices that has stored the original identity data to be queried based on mapping information associated with the original identity data stored by the one(s) of the plurality of authentication devices. In some embodiments, determining the at least one authentication device comprises: determining, based on the query request and the mapping information, the at least one authentication device that stores the original identity data to be queried, where the query request comprising an associated account identifier of the user 134 to be queried, and the mapping information being associated with the flag of the authentication result of the original identity data stored by the corresponding authentication device.

As noted above, in some embodiments, the associated account identifier of the user 134 comprises a combination of the user identification and an associated account identifier of the authentication device associated with the user. For example, the associated account identifier of the user (i.e., the associated account ID) comprises: "user identification" and "an associated account identifier of the authentication device storing the user's original identity data" connected by a connector (e.g., ".", "-", etc.). Therefore, it is possible to, based on the associated account identifier of the user to be queried in the query request, obtain the associated account identifier of the authentication device which stores the original identity data of the user to be queried, and it is possible to, based on the associated account identifier and mapping information of the authentication device, further determine a specific authentication device that stores the original identity data to be queried. In some embodiments, it is further possible to, based on the "user identification" in the associated account of the user, bind the associated account registered by the same user in multiple authentication devices. By adopting the above means, even if the query request relates to a plurality of original identity data to be queried that is stored in a plurality of distributed and unrelated certificate authorities, the management device can effectively determine the corresponding authentication device or authority.

At block 208, in response to receiving signature information about the original identity data to be queried from the user to be queried, the signature information and a key are transmitted to the at least one authentication device, the signature information being generated by a terminal device of the user to be queried based on authorization information received from the query requester. In some embodiments, the signature information indicates at least the query requester, the user to be queried, and the original identity data to be queried. For example, at the management device 110, upon receiving the signature information (for example, the temporary session token signed by a private key of the user, e.g., from the user's digital wallet, or an authorization code in the form of a random number) including the signature of the user to be queried that is signed by his private key and is returned by the user to be queried (for example, returned by the user 134 via the user terminal 130), it is possible to transmit the signature information and the requestor's key to the determined at least one authentication device 120, 122 that has stored the original identity data to be queried, so that the at least one authentication device 120, 122 opens the original identity data to be queried to the query requester.

In some embodiments, the management device is configured to verify the communication channels between the management device, query requestor, and user to be queried are secure, and that the user to be queried authorizes the specific query requestor in communication with the management device and user to be queried is authorized to receive the user's identity data. For example, in some embodiments, after transmitting the authorization information to the query requester, the method 200 further comprises: obtaining feedback data from the user to be queried, the feedback data being generated by the user to be queried based on the authorization information received by the user to be queried from the query requester; and sending an authorization confirmation request to the user to be queried if it is confirmed that the feedback data matches the authorization information, the authorization confirmation request being used for requesting the user to be queried to use the signature information to confirm authorization.

For example, in some embodiments, the query requester packages the temporary session token included in the authorization information obtained from the management device 110 into a web address and displays it as a two-dimensional code. Then the query requester sends the two-dimensional code to the user to be queried. The user to be queried obtains the temporary session token therein based on the authorization information in the form of the two-dimensional code, and then returns the temporary session token to the management device 110. The management device 110 authenticates whether the temporary session token included in the feedback data matches the temporary session token included in the authorization information sent from the management device to the query requester, and in response to confirming that the temporary session tokens match, the management device 110 sends an authorization confirmation request to the user to be queried. The authorization confirmation request indicates at least the original identity data to be queried and the authentication device 120 and/or 122 that stores the original identity data to be queried, so that the user to be queried may confirm whether to agree to offer signature credit to the to-be-queried original identity data by providing the signature information to the management device 110. In some embodiments, it is possible to display to the user to be queried: information on the query requestor (which enterprise wants to query), and the requested identity information (which original identity data that is stored in which KYC enterprise), for example. In the above solution, by authenticating whether the temporary session token included in the feedback data received by the user to be queried matches the temporary session token included in the authorization information sent to the query requestor, and by allowing the user to be queried to use the signature information to confirm the authorization in response to the temporary session tokens matching, it is possible to effectively ensure that the authorization information sent from the query requester to the user to be queried is consistent with the authorization information sent from the management device to the query requester, without being tampered with.

In some embodiments, the method 200 further comprises, after receiving the signature information from the user to be queried: obtaining, from the at least one authentication device that stores the original identity data to be queried, the original identity data to be queried, a hash value of the original identity data to be queried, and the authentication result from when the authentication device 120 authenticated the user's original identity data. The original identity data to be queried, hash value of the original identity data to be queried, and the authentication result being encrypted by query requestor's key, and the hash value of the original identity data to be queried being obtained from a blockchain platform 112; and sending the encrypted original identity data to be queried and the encrypted hash value of the original identity data to be queried and the authentication result to the query requester, where the hash value of the original identity data to be queried can be used by the query requestor to authenticate the original identity data to be queried. In the above solution, by sending the hash value of the original identity data to be queried obtained from the blockchain platform to the query requester, enable the query requester to authenticate the authenticity of the obtained original identity data to be queried, based on the obtained hash value of the original identity data to be queried.

Figure 3:
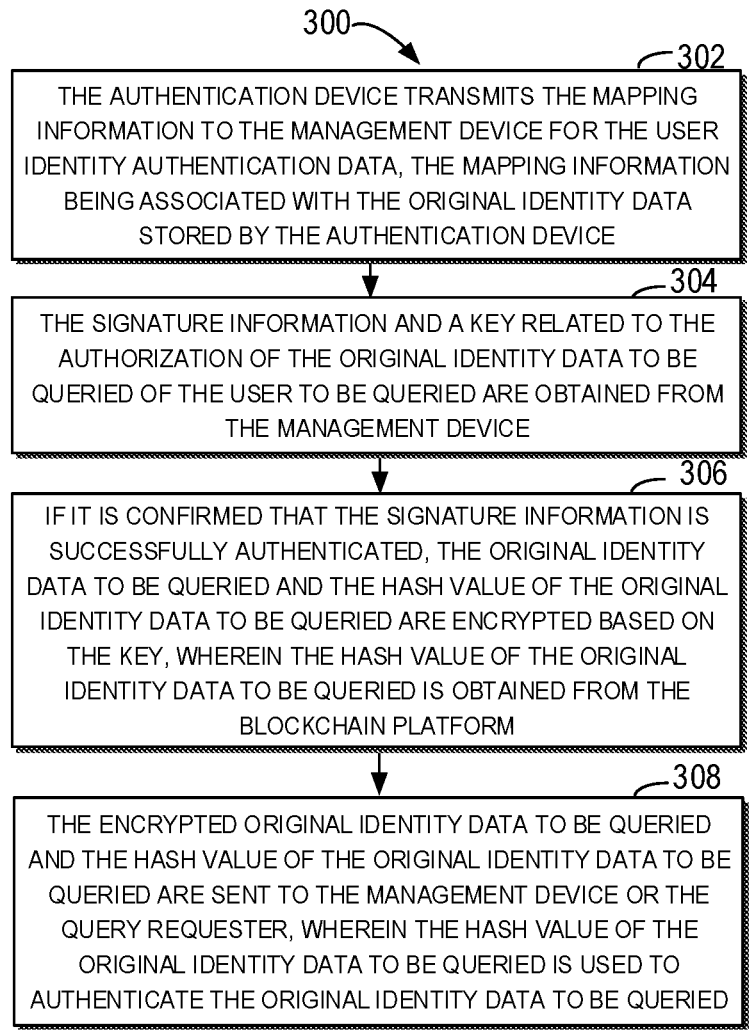
FIG. 3 illustrates a flow chart of a management method 300 of user identity authentication data according to embodiments of the present disclosure.

FIG. 3 illustrates a flow diagram of a method 300 for managing user identity authentication data in accordance with embodiments of the present disclosure. In FIG. 3, various actions are performed by processors of the authentication devices 120, 122 shown in FIG. 1, for example. The method 300 may also include additional actions not shown and/or may omit the actions shown, the scope of the disclosure being not limited in this respect.

At block 302, the authentication device transmits the mapping information to the management device for the user identity authentication data, the mapping information being associated with the original identity data stored by the authentication device. In some embodiments, the authentication device is at least one authentication device that stores the original identity data to be queried and is determined by the management device based on the query requester's query request and the mapping information, wherein the query request comprises an associated account identifier of the user to be queried, and the mapping information is associated with a flag of the authentication result of the original identity data stored by the corresponding authentication device.

In some embodiments, during initialization, the authentication device 120 applies to the management device for an associated account; uses the private key of the authentication device to deploy a smart contract for transmitting identity authentication result data to the blockchain platform 112; and synchronizes mapping information, domain names, and query rules to the management device 110, wherein the domain name is associated with the associated account identifier of the authentication device 120. In some embodiments, the authentication device 120 may apply to the management device 110 for an identifier (such as a username) and password of the authentication device, and acquire an associated account (such as a VeChain Verified ID (VeVID)) for user identity authentication data management at the management device 110. The domain name mentioned above is used to indicate the authentication device 120 at the management device 110 and is associated with the associated account applied by the authentication device 120, and thus the domain name may also be referred to as an associated account domain name of the authentication device.

In some embodiments, when the authentication device 120 authenticates the user's original identity data, the authentication device 120 generates identity authentication result data in response to confirming that the user's original identity data is successfully authenticated. The identity authentication result data comprises at least one of the following: an associated account identifier of the user, an authentication result and a hash value of the original identity data, wherein the associated account identifier of the user is associated with the corresponding authentication device 120; and based on the smart contract deployed via the private key, the authentication device 120 transmits the identity authentication result data to the blockchain platform.

In some embodiments, the authentication result comprises at least one of the following: an associated account identifier of the user, an associated account identifier of an associated user that is associated with the user, status of the associated account of the user, and an identity type of the user, the identity type being selected from a group consisting of at least one of the following: an individual, an organization, a device, and a smart contract. In the above solution, based on the parsing of the user identity type, an appropriate authentication policy may be selected. For example, if the identity type indicates that the user is an individual, the authentication policy may comprise certification of materials such as identity documents and academic degree certificates. If the identity type indicates that the user is an organization, the authentication policy may comprise certification of legal representative, business license and other materials.

In some embodiments, the authentication result comprises multiple flags, for example, flags with binary digits, each flag of the multiple flags corresponding to a particular data type. Thus, the flags can be used to determine whether a corresponding item of the original identity data comprising a plurality of items is successfully authenticated. For example, if a certain flag of the flags is "1", it indicates that the corresponding item in the original identity data was successfully authenticated; while if it is "0", it indicates that the corresponding item in the original identity data was not successfully authenticated or was not otherwise received. In the above solution, based on the parsing of the multiple binary digit flags of the authentication result, the authentication profile of the original identity data of the user associated with the multi flags can be quickly learned. Through the query based on the flags, it is possible to efficiently obtain information of a plurality of users whose original identity data corresponding items have the same characteristics.

In some embodiments, the hash value of the original identity data is generated by hashing the items in the original identity data corresponding to the flags indicating that the authentication is successful.

At block 304, the signature information and a key related to the authorization of the original identity data to be queried of the user to be queried are obtained from the management device. In some embodiments, the authentication device 120 obtains the signature information and a public key signed by the private key of the user to be queried, from the management device for the user identity data. The public key is used by the authentication device to encrypt the original identity data to be queried. In some embodiments, the key is included, for example, in a query request sent from the query requester, the key can then be utilized by the authentication device to encrypt the original identity data to be queried so that only the query requestor can decrypt and access the requested information. The encryption key is, for example, a secret key in case of symmetric encryption or a public key in case of asymmetric encryption.

At block 306, if it is confirmed that the signature information is successfully authenticated, the original identity data to be queried and the hash value of the original identity data to be queried are encrypted with the query requestor's key, wherein the hash value of the original identity data to be queried is obtained from the blockchain platform. In some embodiments, confirming that the signature information is successfully authenticated comprises: confirming whether the query request is signed with an indicated private key by the relevant address in the application for user identity authentication data management. In some embodiments, in response to confirming that the signature information is not successfully authenticated, error information regarding the original identity data to be queried is sent. In some embodiments, the authentication device 120 obtains the original identity data to be queried and the hash value of the original identity data to be queried based on the signature information, where the signature information at least indicates the query requester, the user to be queried, and the original identity data to be queried, wherein the original identity data to be queried is stored at the authentication device 120 and the hash value of the original identity data to be queried is stored at the blockchain platform 112. For example, the authentication device 120 obtains the locally stored original identity data that was queried and the hash value of the original identity data that was queried stored at the blockchain platform 112 based on the associated account identifier of the user to be queried and the authentication result flags corresponding to the original data to be queried.

At block 308, the encrypted original identity data to be queried and the hash value of the original identity data to be queried are sent to the management device or the query requester, wherein the hash value of the original identity data to be queried is used to authenticate the original identity data to be queried. In some embodiments, the hash value of the original identity data to be queried obtained from the blockchain platform 112 may be used by the query requestor to verify the authenticity of the original identity data obtained by the query requester.

Figure 4:
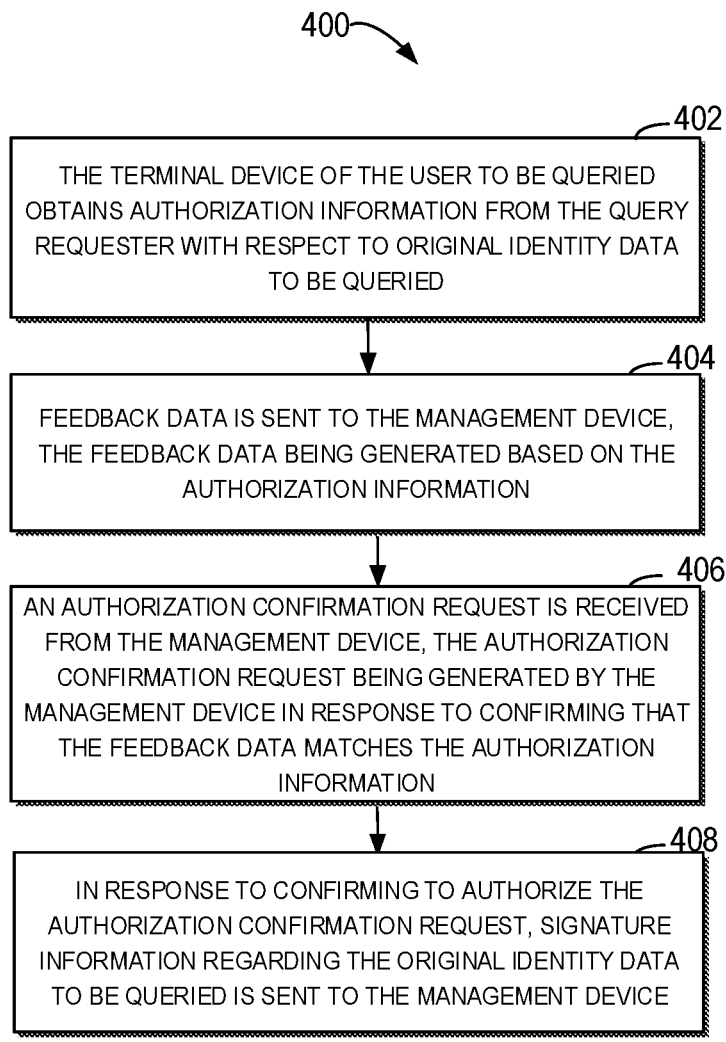
FIG. 4 illustrates a flow chart of a method 400 of authorizing a query of user identity authentication data according to embodiments of the present disclosure.

FIG. 4 illustrates a flow diagram of a method 400 for authorizing a query of user identity authentication data in accordance with embodiments of the present disclosure.

In FIG. 4, various actions are performed by the processor of the user terminal device 130 shown in FIG. 1, for example. The method 400 may also include additional actions not shown and/or may omit the actions shown, the scope of the disclosure being not limited in this respect.

At block 402, the terminal device of the user to be queried obtains authorization information from the query requester with respect to original identity data to be queried.

At block 404, feedback data is sent to the management device, the feedback data being generated based on the authorization information.

At block 406, an authorization confirmation request is received from the management device, the authorization confirmation request being generated by the management device in response to confirming that the feedback data matches the authorization information. In some embodiments, the authorization confirmation request at least indicates the query requester, the original identity data to be queried, and the authentication device storing the original identity data to be queried. In some embodiments, confirming that the feedback data matches the authorization information comprises: confirming that the authorization information and the feedback data both comprise a temporary session token sent from the management device to the query requestor.

At block 408, in response to confirming to authorize the authorization confirmation request, signature information regarding the original identity data to be queried is sent to the management device. In some embodiments, the signature information, for example, comprises a temporary session token or a random number signed via a key, the random number being from the management device 110.

Figure 5:
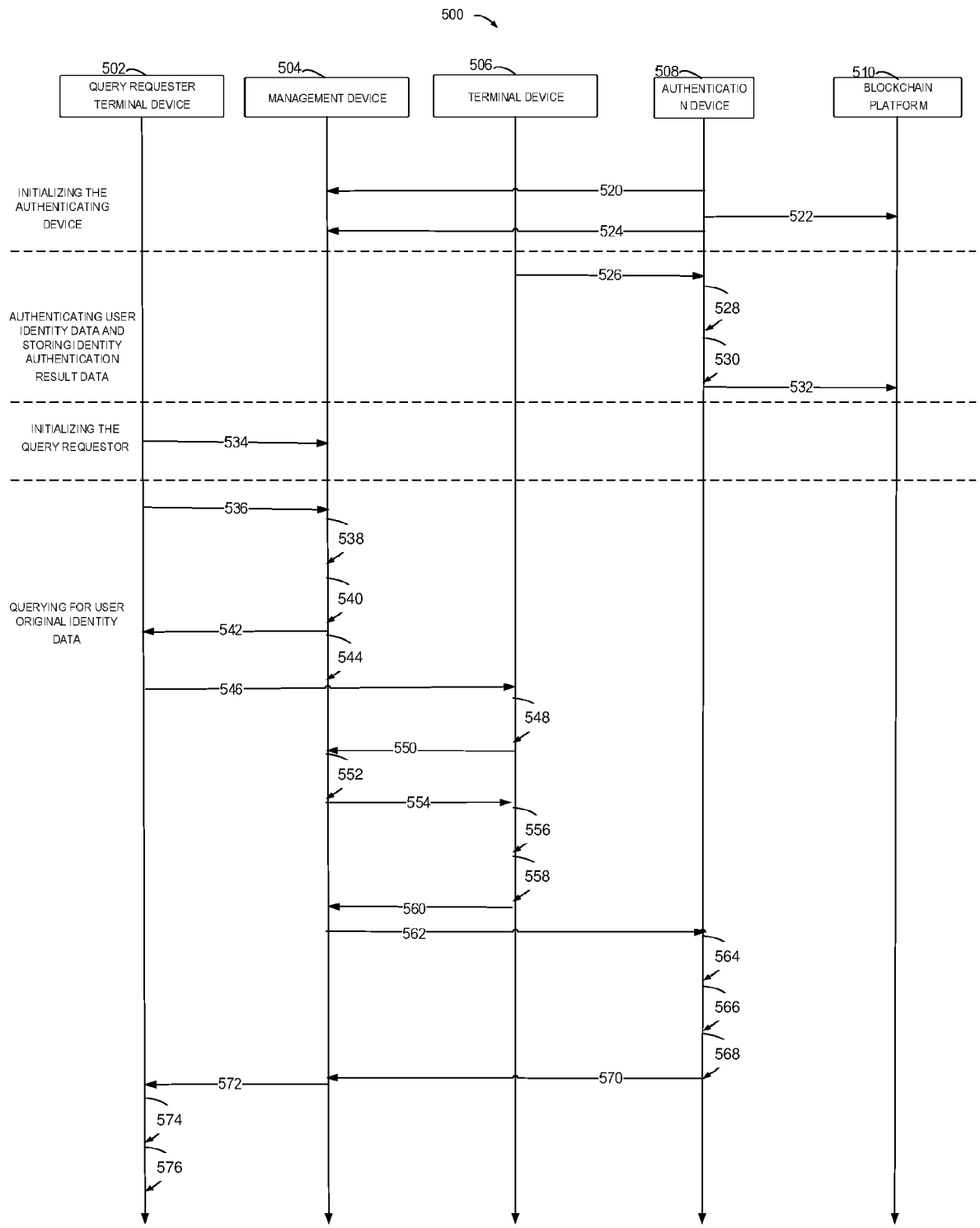
FIG. 5 illustrates a diagram of a data flow direction of a management method 500 of user identity authentication data according to embodiments of the present disclosure.

FIG. 5 illustrates an interaction diagram of a method 500 for managing user identity authentication data in accordance with some embodiments of the present disclosure. In FIG. 5, various actions are implemented, for example, by a query requester terminal device 502, a management device 504, and a terminal device 506 of the user to be queried, an authentication device 508, and a blockchain platform 510. In some embodiments, the method 500 involves initializing the authenticating device, authenticating user identity data and storing identity authentication result data, initializing the query requester, querying for user original identity data, and the like. It should be appreciated that the method 500 may further include additional actions not shown and/or the illustrated actions can be omitted, and the scope of the present disclosure is not limited in this respect.

The following examples are used to illustrate various actions for initializing the authentication device.

At 520, the authentication device 508 applies to the management device 504 for an identifier (e.g., username) and password of the authentication device 508, and obtains an associated account for user identity authentication data management at the management device 504. In some embodiments, the associated account is, for example, identified as a management device 504-specific identifier (e.g., VeVID) of the KYC enterprise to which the authentication device 508 belongs. At 522, a smart contract for user identity authentication is deployed to the blockchain platform 510 by using the private key of the authentication device 508. At 524, the associated account domain name, mapping information, and query rule are synchronized to the management device 504, wherein the mapping information is used to indicate the meaning of each flag of authentication results generated by the authentication devices. The query rule indicates a queryable range of the original identity data, and the associated account domain name is used to indicate the authentication device 508 at the management device 504, and is in association with an associated account applied for by the authentication device 508. In some embodiments, the mapping information is, for example, a 256-bit data dictionary rule, and the associated account domain name is, for example, a VeVID domain name of a KYC enterprise. In some embodiments, the associated account domain name, mapping information, and query rules of the management device 504 can be queried based on the identifier (username) applied by the authentication device 508. With the above means, each authentication device for storing user KYC information can establish contact with the management device by initialization, and each authentication device deploys a smart contract for uploading user KYC information on blockchain platform.

The following examples are used to illustrate actions for authenticating user identity data and storing the identity authentication result data.

At the user terminal device, for example at the terminal device 506 of the user to be queried, at 526, the user's original identity data and the authentication request are sent to one or more authentication devices 508. In some embodiments, the user may also provide the user's original identity data and authentication request to the authentication device 508, or to KYC enterprise to which the authentication device 508 belongs in other manners.

At authentication device 508, the original identity data is authenticated at 528. At 530, if the original identity data is successfully authenticated, the user's identity authentication result data is generated and stored. In some embodiments, the identity authentication result data comprises at least an associated account of the user, an authentication result, for example, an authentication result having multiple flags (e.g., 256 bits) and a hash value of the original identity data. In some embodiments, the associated account of the user is associated with an associated account of the authentication device 508. The hash value of the original identity data is generated by hashing the original identity data item corresponding to the flag indicating a successful authentication result. In some embodiments, the authentication device 508 stores the user's original identity data. At 532, the authentication result data is uploaded to the blockchain platform 510 based on the deployed smart contract. With the above means, each authentication device can authenticate and store the KYC information of the user, and upload the generated user associated account, authentication result and hash value of the original identity data to blockchain platform, for authenticating authenticity of the shared original identity data.

The following example is used to illustrate actions for initializing the query requester.

At 534, the terminal device 502 of the query requester applies to the management device 504 for an identifier (such as a username) and password of the query requester. In addition, the terminal device 502 of the query requester can also apply to the management device 504 for an associated account for identity authentication data management. By adopting the above means, the query requester establishes contact with the management device through initialization.

The following example is used to illustrate actions for querying for the user's original identity data.

At 536, the query requester terminal device 502 sends a query request to the management device 504, the query request may include an indication of one or more of the query requester, the user to be queried, and the original identity data to be queried. In some embodiments, the query request further indicates an encryption key for encrypting the query result, for example a key that can be used by the authentication device 508 to encrypt the requested information before transmitting the information to the query requestor (e.g., a secret key in case of symmetric encryption or a public key in case of asymmetric encryption).

At management device 504, it is authenticated at 538 whether the query requester is legitimate and whether the management device is in communication with at least one authentication device that is storing the queried original identity data. If yes, the query request will be successfully authenticated. In some embodiments, the authenticating comprises: confirming whether the query requester is legitimate based on an identifier (user name) of the query requester; and confirming whether the at least one authentication device is present that has stored the queried original identity data according to the associated account and mapping information of the user to be queried. In some embodiments, the authenticating further comprises: confirming, according to the query rule of the authentication device, whether the data to be queried belongs to a queryable range. At 540, a temporary session token is generated by the management device if the query request is successfully authenticated. At 542, the temporary session token is sent to the terminal device 502 of the query requester. At 544, based on the query request and the mapping information, at least one authentication device 508 that stores the original identity data of the user to be queried is determined. In some embodiments, when the management device 504 determines a plurality of authentication devices 508 that store the original identity data of the user to be queried, a plurality of temporary session tokens are sent to the terminal device 502 of the query requester. For example, each temporary session token corresponds to a query service information directed to a corresponding authentication device.

At the terminal device 502 of the query requester, after obtaining the temporary session token(s), at 546, authorization information including the temporary session token(s) is sent from terminal device 502 of the query requester to terminal device 506 of the user to be queried. In some embodiments, the temporary session token(s) is packaged into a web address and presented as a two-dimensional code.

At the terminal device 506 of the user to be queried, at 548, the temporary session token is obtained based on the authorization information. In some embodiments, the user to be queried uses a wallet App to scan the authorization information of the two-dimensional code to obtain the temporary session token. At 550, feedback data including the acquired temporary session token is sent to the management device 504.

At management device 504, at 552, the temporary session token is authenticated. In some embodiments, the authentication in 552 comprises authenticating whether the temporary session token included in the feedback data from the terminal device 506 of the user to be queried matches the temporary session token included in the authorization information previously sent at 542 from the management device to the terminal device 502 of the query requestor. At 554, in response to confirming that the temporary session token is successfully authenticated, an authorization confirmation request corresponding to the temporary session token is sent to the terminal device 506 of the user to be queried, and the authorization confirmation request indicates one or more of the query requester, the original identity data to be queried, and the corresponding authentication device(s). For example, the query service information corresponding to the temporary session token is displayed to the user to be queried, that is, display which query requester wants to query for which items of original identity data of which associated account on which authentication device.

At the terminal device 506 of the user to be queried, at 556, it is confirmed whether to authorize for the authorization confirmation request. At 558, in response to confirming to authorize for the authorization confirmation request, signature information based on a private key signature is generated. In some embodiments, it is possible to use a wallet bound by an associated account of the user to be queried to sign the authorization confirmation request by using a private key, to generate a signature hash value, namely, generate the signature information. At 560, the signature information is sent to the management device.

At 562, after acquiring the signature information, in response to receiving the signature information from the user to be queried, the management device 504 transmits the signature information to the at least one confirmed authentication device 508 that stores the original identity data to be queried. In some embodiments, in addition to transmitting the signature information to the at least one confirmed authenticated device 508, a public key for encrypting the query result is sent as well.

After the authentication device 508 acquires the signature information and the public key, at 564, the authentication device 508 confirms whether the signature information has been successfully authenticated. In some embodiments, it is possible to confirm whether the signature information has been successfully authenticated by confirming whether the query request is signed with a private key at an address corresponding to the account associated with the requested original data. In one aspect, in response to confirming at 564 that the signature information has been successfully authenticated, at 566, the to-be-queried original data locally stored and the hash value of the original identify data stored by the blockchain platform 510 is encrypted based on a key (e.g., the obtained public key). On the other hand, in response to confirming at 564 that the signature information is not successfully authenticated, at 568, an error code is generated. At 570, (a) the original identity data to be queried and the hash value of the original identity data to be queried, encrypted by using a key (e.g., the obtained public key) or (b) an error code, is sent to the management device 504. In some embodiments, the authentication device 508 obtains the original identity data to be queried and the hash value of the original identity data to be queried, based on the associated account identifier of the user to be queried indicated in the mapping information and the signature information.

At 572, the management device 504 forwards the original identity data to be queried and the hash value of the original identity data to be queried which is encrypted by a key (e.g., a public key) or an error code to the terminal device 502 of the query requester.

After obtaining the original identity data to be queried and the hash value of the original identity data to be queried which is encrypted by a key (e.g., a public key), at 574, the query requester terminal device 502 uses a key for decrypting to decrypt to obtain the original identity data to be queried and the hash value of the original identity data to be queried. At 576, based on the obtained hash value of the original identity data to be queried, the authenticity of the obtained original identity data to be queried is authenticated. In some embodiments, the authenticity of the obtained original identity to be queried is authenticated based on comparing whether a hash value of the obtained original identity data is consistent with the received hash value of the original identity data that is stored by the associated account on the blockchain platform 510.

By adopting the foregoing method 500, it is possible to effectively ensure the consensus and the non-tampering of the original identity data to be queried and/or the identity authentication result data; it is possible to effectively ensure encrypting the authenticated original identity data in the case of obtaining authorization of the user to be queried, to open the authenticated original identity data only to a particular query requester that obtains the signature information and the key; thereby effectively enabling trusted sharing of authenticated user identity authentication data.

Figure 6:
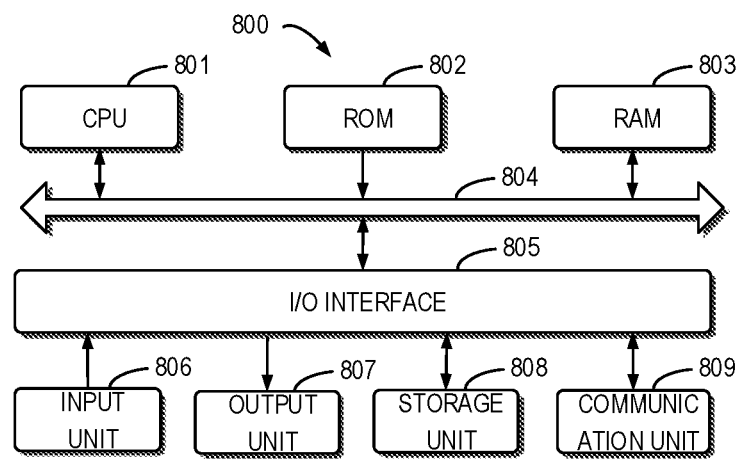
FIG. 6 illustrates a block diagram of an electronic device 600 adapted to implement embodiments of the present disclosure.

FIG. 6 illustrates a block diagram of an electronic device 600 adapted to implement an implementation of the subject matter described herein. The device 600 may be used to implement one or more hosts (e.g., the management device 110, authentication devices 120 and 122 shown in FIG. 1, the management device 504 and authentication device 508 shown in FIG. 5) of the user identity authentication data management system 100 shown in FIG. 1 and FIG. 5. As shown in FIG. 6, the device 600 comprises a central processing unit (CPU) 601 which is capable of performing various actions and processes in accordance with a computer program instruction stored in a read only memory (ROM) 602 or a computer program instruction loaded from a storage unit 608 to a random access memory (RAM) 603. In addition, RAM 603 are stored various programs and data as required by operation of the device 600. The CPU 601, the ROM 602 and the RAM 603 are connected to one another via a bus 604. An input/output (I/O) interface 605 is also connected to the bus 604.

The following components of the device 600 are connected to the I/O interface 605: an input unit 606 including a keyboard, a mouse, or the like; an output unit 607 including various displays, loudspeakers and the like; the storage unit 608 such as a disk, an optical disk or the like; a communication unit 609 such as a network card, a modem, a wireless communication transceiver or the like. The communication unit 609 allows the device 600 to exchange information/data with other devices through a computer network such as the Internet and/or various telecommunication networks.

The processing unit 601 performs various methods and processing described above, for example, performs the methods 200, 300, 400 and 500. For example, in some embodiments, the methods 200, 300, 400 and 500 may be implemented as a computer software program, which is stored in a machine-readable medium, for example the storage unit 608. In some embodiments, part or all of the computer program may be loaded into and/or installed on the device 600 via the ROM 602 and/or communication unit 609. When the computer program is loaded to the RAM 603 and executed by the CPU 601, one or more operations of the methods 200, 300, 400 and 500 described above may be performed. Alternatively, in other embodiments, the CPU 601 may be configured in any other proper manners (e.g., by virtue of a firmware) to perform one or more actions of the methods 200, 300, 400 and 500.

The present disclosure may be a method, a device, a system and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium comprises the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in one block or more blocks of the flowchart and/or block diagram.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in one block or more blocks of the flowchart and/or block diagram.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of instruction, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The depictions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What are described are only preferred embodiments of the present disclosure, and not intended to limit the present disclosure. Those skilled in the art appreciate that the present disclosure may have various modifications and variations. Any modifications, equivalent substitutes and improvements within the spirit and principles of the present disclosure all fall within the protection scope of the present disclosure.

We claim:

1. A method of managing user identity authentication data, comprising:
   authenticating, at a management device, a query request from a query requester for original identity data of a user to be queried, the query request including at least a key for encrypting the original identity data to be queried;
   in response to the query request being successfully authenticated, sending authorization information for the query request to the query requester;
   determining, based on mapping information associated with the original identity data stored by one or more of a plurality of authentication devices, at least one of the plurality of authentication devices to query for the original identity data; and
   in response to receiving signature information corresponding to the query request from the user to be queried, transmitting the signature information and a key to the at least one authentication device, wherein the signature information indicates the user to be queried approves the request and was generated by a terminal device of the user to be queried based on the authorization information, the authorization information having been received at the terminal device of the user to be queried from the query requester.

2. The method according to claim 1, where sending the authorization information comprises:
   determining whether the query request is successfully authenticated based on confirming whether the query requester is legitimate and whether the at least one authentication device that has stored the original identity data to be queried is present; and
   in response to determining that the query request is successfully authenticated, sending the authorization information to the query requester, the authorization information comprising a temporary session token.

3. The method according to claim 1, wherein the step of determining the at least one authentication device from the plurality of authentication devices comprises:
   determining, based on the query request and the mapping information, the at least one authentication device that is storing the original identity data to be queried, the query request further comprising an associated account identifier of the user to be queried, and the mapping information being associated with a flag of an authentication result of the original identity data from a prior authentication of the original identity data by the authentication device that is storing the original identity data to be queried.

4. The method according to claim 1, further comprising:
   obtaining feedback data from the user to be queried, the feedback data being generated by the user to be queried based on the authorization information received from the query requester; and
   in response to confirming that the feedback data matches the authorization information, sending to the user to be queried an authorization confirmation request, the authorization confirmation request being used for requesting the user to be queried to reply with the signature information to confirm authorization.

5. The method according to claim 1, wherein the signature information indicates at least the query requester, the user to be queried, and the original identity data to be queried.

6. The method according to claim 1, further comprising:
   obtaining, from the at least one authentication device that stores the original identity data to be queried, the original identity data to be queried and a hash value of the original identity data to be queried, the original identity data to be queried and the hash value of the original identity data to be queried being encrypted by the key, the hash value of the original identity data to be queried being obtained from a blockchain platform, and the key being a public key of the query requester; and
   sending the encrypted original identity data to be queried and the encrypted hash value of the original identity data to be queried to the query requester, the hash value of the original identity data to be queried being used to authenticate the original identity data to be queried.

7. A management device for user identity authentication data, the device comprising:
   a memory configured to store one or more programs; and
   a processing unit coupled to the memory and configured to execute said one or more programs to cause the management device to perform a method of managing user identity authentication data, wherein the method comprises:
   authenticating, at a management device, a query request from a query requester for original identity data of a user to be queried, the query request including at least a key for encrypting the original identity data to be queried;
   in response to the query request being successfully authenticated, sending authorization information for the query request to the query requester;
   determining, based on mapping information associated with the original identity data stored by one or more of a plurality of authentication devices, at least one of the plurality of authentication devices to query for the original identity data; and
   in response to receiving signature information corresponding to the query request from the user to be queried, transmitting the signature information and a key to the at least one authentication device, wherein the signature information indicates the user to be queried approves the request and was generated by a terminal device of the user to be queried based on the authorization information, the authorization information having been received at the terminal device of the user to be queried from the query requester.

8. A non-transitory computer readable storage medium having machine executable instructions stored thereon, the machine executable instructions, when executed, causing a machine to perform a method of managing user identity authentication data, wherein the method comprises:

authenticating, at a management device, a query request from a query requester for original identity data of a user to be queried, the query request including at least a key for encrypting the original identity data to be queried;
in response to the query request being successfully authenticated, sending authorization information for the query request to the query requester;
determining, based on mapping information associated with the original identity data stored by one or more of a plurality of authentication devices, at least one of the plurality of authentication devices to query for the original identity data; and
in response to receiving signature information corresponding to the query request from the user to be queried, transmitting the signature information and a key to the at least one authentication device, wherein the signature information indicates the user to be queried approves the request and was generated by a terminal device of the user to be queried based on the authorization information, the authorization information having been received at the terminal device of the user to be queried from the query requester.

9. A computer program product being tangibly stored on a non-transient computer readable medium and comprising machine executable instruction, the machine executable instructions, when being executed, causing a machine to perform a method of managing user identity authentication data, wherein the method comprises:
authenticating, at a management device, a query request from a query requester for original identity data of a user to be queried, the query request including at least a key for encrypting the original identity data to be queried;
in response to the query request being successfully authenticated, sending authorization information for the query request to the query requester;
determining, based on mapping information associated with the original identity data stored by one or more of a plurality of authentication devices, at least one of the plurality of authentication devices to query for the original identity data; and
in response to receiving signature information corresponding to the query request from the user to be queried, transmitting the signature information and a key to the at least one authentication device, wherein the signature information indicates the user to be queried approves the request and was generated by a terminal device of the user to be queried based on the authorization information, the authorization information having been received at the terminal device of the user to be queried from the query requester.

10. The method according to claim 7, where sending the authorization information comprises:
determining whether the query request is successfully authenticated based on confirming whether the query requester is legitimate and whether the at least one authentication device that has stored the original identity data to be queried is present; and
in response to determining that the query request is successfully authenticated, sending the authorization information to the query requester, the authorization information comprising a temporary session token.

11. The method according to claim 7, wherein the step of determining the at least one authentication device from the plurality of authentication devices comprises:
determining, based on the query request and the mapping information, the at least one authentication device that is storing the original identity data to be queried, the query request further comprising an associated account identifier of the user to be queried, and the mapping information being associated with a flag of an authentication result of the original identity data from a prior authentication of the original identity data by the authentication device that is storing the original identity data to be queried.

12. The method according to claim 7, further comprising:
obtaining feedback data from the user to be queried, the feedback data being generated by the user to be queried based on the authorization information received from the query requester; and
in response to confirming that the feedback data matches the authorization information, sending to the user to be queried an authorization confirmation request, the authorization confirmation request being used for requesting the user to be queried to reply with the signature information to confirm authorization.

13. The method according to claim 7, wherein the signature information indicates at least the query requester, the user to be queried, and the original identity data to be queried.

14. The method according to claim 7, further comprising:
obtaining, from the at least one authentication device that stores the original identity data to be queried, the original identity data to be queried and a hash value of the original identity data to be queried, the original identity data to be queried and the hash value of the original identity data to be queried being encrypted by the key, the hash value of the original identity data to be queried being obtained from a blockchain platform, and the key being a public key of the query requester; and
sending the encrypted original identity data to be queried and the encrypted hash value of the original identity data to be queried to the query requester, the hash value of the original identity data to be queried being used to authenticate the original identity data to be queried.

15. The method according to claim 8, where sending the authorization information comprises:
determining whether the query request is successfully authenticated based on confirming whether the query requester is legitimate and whether the at least one authentication device that has stored the original identity data to be queried is present; and
in response to determining that the query request is successfully authenticated, sending the authorization information to the query requester, the authorization information comprising a temporary session token.

16. The method according to claim 8, wherein the step of determining the at least one authentication device from the plurality of authentication devices comprises:
determining, based on the query request and the mapping information, the at least one authentication device that is storing the original identity data to be queried, the query request further comprising an associated account identifier of the user to be queried, and the mapping information being associated with a flag of an authentication result of the original identity data from a prior authentication of the original identity data by the authentication device that is storing the original identity data to be queried.

17. The method according to claim 8, further comprising:
obtaining feedback data from the user to be queried, the feedback data being generated by the user to be queried based on the authorization information received from the query requester; and
in response to confirming that the feedback data matches the authorization information, sending to the user to be queried an authorization confirmation request, the authorization confirmation request being used for requesting the user to be queried to reply with the signature information to confirm authorization.

18. The method according to claim 8, wherein the signature information indicates at least the query requester, the user to be queried, and the original identity data to be queried.

19. The method according to claim 8, further comprising:
obtaining, from the at least one authentication device that stores the original identity data to be queried, the original identity data to be queried and a hash value of the original identity data to be queried, the original identity data to be queried and the hash value of the original identity data to be queried being encrypted by the key, the hash value of the original identity data to be queried being obtained from a blockchain platform, and the key being a public key of the query requester; and
sending the encrypted original identity data to be queried and the encrypted hash value of the original identity data to be queried to the query requester, the hash value of the original identity data to be queried being used to authenticate the original identity data to be queried.

20. The method according to claim 9, where sending the authorization information comprises:
determining whether the query request is successfully authenticated based on confirming whether the query requester is legitimate and whether the at least one authentication device that has stored the original identity data to be queried is present; and
in response to determining that the query request is successfully authenticated, sending the authorization information to the query requester, the authorization information comprising a temporary session token.

21. The method according to claim 9, wherein the step of determining the at least one authentication device from the plurality of authentication devices comprises:
determining, based on the query request and the mapping information, the at least one authentication device that is storing the original identity data to be queried, the query request further comprising an associated account identifier of the user to be queried, and the mapping information being associated with a flag of an authentication result of the original identity data from a prior authentication of the original identity data by the authentication device that is storing the original identity data to be queried.

22. The method according to claim 9, further comprising:
obtaining feedback data from the user to be queried, the feedback data being generated by the user to be queried based on the authorization information received from the query requester; and
in response to confirming that the feedback data matches the authorization information, sending to the user to be queried an authorization confirmation request, the authorization confirmation request being used for requesting the user to be queried to reply with the signature information to confirm authorization.

23. The method according to claim 9, wherein the signature information indicates at least the query requester, the user to be queried, and the original identity data to be queried.

24. The method according to claim 9, further comprising:
obtaining, from the at least one authentication device that stores the original identity data to be queried, the original identity data to be queried and a hash value of the original identity data to be queried, the original identity data to be queried and the hash value of the original identity data to be queried being encrypted by the key, the hash value of the original identity data to be queried being obtained from a blockchain platform, and the key being a public key of the query requester; and
sending the encrypted original identity data to be queried and the encrypted hash value of the original identity data to be queried to the query requester, the hash value of the original identity data to be queried being used to authenticate the original identity data to be queried.

* * * * *